United States Patent
Yadav et al.

(10) Patent No.: US 11,921,586 B2
(45) Date of Patent: Mar. 5, 2024

(54) METHOD AND SYSTEM FOR BACKING UP VIRTUAL MACHINES IN A CLUSTER SHARED VOLUME

(71) Applicant: Dell Products L.P., Round Rock, TX (US)

(72) Inventors: Sunil Yadav, Bangalore (IN); Shelesh Chopra, Bangalore (IN); Aaditya Rakesh Bansal, Bagalore (IN); Manish Sharma, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 177 days.

(21) Appl. No.: 17/685,642

(22) Filed: Mar. 3, 2022

(65) Prior Publication Data
US 2023/0281083 A1 Sep. 7, 2023

(51) Int. Cl.
| | | |
|---|---|---|
| G06F 7/02 | (2006.01) | |
| G06F 9/455 | (2018.01) | |
| G06F 11/14 | (2006.01) | |
| G06F 16/00 | (2019.01) | |
| G06F 16/11 | (2019.01) | |

(52) U.S. Cl.
CPC ...... *G06F 11/1451* (2013.01); *G06F 9/45558* (2013.01); *G06F 11/1464* (2013.01); *G06F 16/113* (2019.01); *G06F 2009/45562* (2013.01); *G06F 2201/815* (2013.01)

(58) Field of Classification Search
CPC ............... G06F 11/1451; G06F 16/113; G06F 9/45558; G06F 11/1464; G06F 2009/45562; G06F 2201/815
See application file for complete search history.

(56) References Cited

U.S. PATENT DOCUMENTS

| | | | | |
|---|---|---|---|---|
| 11,163,147 | B2* | 11/2021 | Siebenmorgen ... | G02B 21/0032 |
| 2020/0125262 | A1* | 4/2020 | Hebsur ............... | G06F 11/1458 |
| 2020/0133801 | A1* | 4/2020 | Srinivasan ........... | G06F 3/0631 |

OTHER PUBLICATIONS

Atzi, "Prevent a VM from migration," VMTN Communities, VMWARE, question asked Jan. 27, 2011 and responses Jan. 27, 2011-Jan. 31, 2011, retrieved from https://communities.vmware.com/t5/ESXi-Discussions/Prevent-a-VM-from-migration/td-p/822790 (Year: 2011).*

* cited by examiner

*Primary Examiner* — Bruce M Moser
(74) *Attorney, Agent, or Firm* — Chamberlain, Hrdlicka, White, Williams & Aughtry; Aly Z. Dossa

(57) ABSTRACT

A method for performing a data backup process on a cluster includes: obtaining a backup generation request for virtual machines; in response to obtaining the backup generation request: generating a first set of backup groupings based on the backup generation request where each of the first set of backup groupings includes at least one of the virtual machines; issuing a disable migration command to a plurality of production hosts where each of the plurality of production hosts is associated with at least one of the virtual machines; identifying, after the issuing, a virtual machine of the virtual machines that is migrating; removing, based on the identifying, the virtual machine from the first set of backup groupings to obtain a second set of backup groupings where the virtual machine is placed in an excluded group after the removing; and backing up the second set of backup groupings.

20 Claims, 13 Drawing Sheets

Example Backup Process Stack 300

Backup Process Stack Entry A 310A

Virtual Machine Identifiers (311)

| Virtual Machine Identifier A 312A | ● ● ● | Virtual Machine Identifier N 312N |

Backup Process Stack Entry N 310N

FIG. 3

Example Backup Groupings Queue 540

Backup Grouping 1 542
- Virtual Machine Identifier A 512A
- Virtual Machine Identifier B 512B
- Virtual Machine Identifier C 512C

Backup Grouping 2 544
- [MIGRATING] Virtual Machine Identifier E 512E
- Virtual Machine Identifier F 512F

Backup Grouping 3 546
- Virtual Machine Identifier G 512G
- Virtual Machine Identifier H 512H
- [MIGRATING] Virtual Machine Identifier I 512I

FIG. 5B

[MIGRATION DISABLED] Production Host 1 522

Virtual Machine A 502A

Virtual Machine B 502B

Virtual Machine C 502C

[MIGRATION DISABLED] Production Host 2 524

[MIGRATING] Virtual Machine E 502E

Virtual Machine F 502F

[MIGRATION DISABLED] Production Host 3 526

Virtual Machine G 502G

Virtual Machine H 502H

[MIGRATING] Virtual Machine I 502I

[MIGRATION DISABLED] Production Host 4 528

Virtual Machine D 502D

FIG. 5C

Example Backup Groupings Queue 540

Backup Grouping 1 542
- Virtual Machine Identifier A 512A
- Virtual Machine Identifier B 512B
- Virtual Machine Identifier C 512C

Backup Grouping 2 544
- Virtual Machine Identifier F 512F

Backup Grouping 3 546
- Virtual Machine Identifier G 512G
- Virtual Machine Identifier H 512H

Excluded Group 548
- MIGRATING Virtual Machine Identifier E 512E
- MIGRATING Virtual Machine Identifier I 512I

FIG. 5D

Example Backup Groupings Queue 540

Backup Grouping 4 530

Virtual Machine Identifier E
512E

Virtual Machine Identifier I
512I

Excluded Group 528

FIG. 5E

METHOD AND SYSTEM FOR BACKING UP VIRTUAL MACHINES IN A CLUSTER SHARED VOLUME

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

SUMMARY

In general, certain embodiments described herein relate to a method for performing data backup process on a cluster. The method may include obtaining backup generation request for virtual machines; in response to obtaining the backup generation request: generating a first set of backup groupings based on the backup generation request, wherein each of the first set of backup groupings comprises at least one of the virtual machines; issuing a disable migration command to a plurality of production hosts, wherein each of the plurality of production hosts is associated with at least one of the virtual machines; identifying, after the issuing, a virtual machine of the virtual machines that is migrating; removing, based on the identifying, the virtual machine from the first set of backup groupings to obtain a second set of backup groupings, wherein the virtual machine is placed in an excluded group after the removing; and backing up the second set of backup groupings.

In general, certain embodiments described herein relate to a system for performing data backup process on a cluster. The system may include a shared storage and a primary data node that is programmed to obtain a backup generation request for virtual machines; in response to obtaining the backup generation request: generate a first set of backup groupings based on the backup generation request, wherein each of the first set of backup groupings comprises at least one of the virtual machines; issue a disable migration command to a plurality of production hosts, wherein each of the plurality of production hosts is associated with at least one of the virtual machines; identify, after the issuing, a virtual machine of the virtual machines that is migrating; remove, based on the identifying, the virtual machine from the first set of backup groupings to obtain a second set of backup groupings, wherein the virtual machine is placed in an excluded group after the removing; and back up the second set of backup groupings.

In general, certain embodiments described herein relate to a non-transitory computer readable medium that includes computer readable program code, which when executed by a computer processor enables the computer processor to perform a method for obtaining backup generation request for virtual machines; in response to obtaining the backup generation request: generating a first set of backup groupings based on the backup generation request, wherein each of the first set of backup groupings comprises at least one of the virtual machines; issuing a disable migration command to a plurality of production hosts, wherein each of the plurality of production hosts is associated with at least one of the virtual machines; identifying, after the issuing, a virtual machine of the virtual machines that is migrating; removing, based on the identifying, the virtual machine from the first set of backup groupings to obtain a second set of backup groupings, wherein the virtual machine is placed in an excluded group after the removing; and backing up the second set of backup groupings.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3 shows a diagram of an example backup process stack in accordance with one or more embodiments of the invention.

FIGS. 5A-5E show an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of one or more embodiments disclosed herein. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods directed to concurrently generating backups of virtual machines while reducing failure probabilities and increasing reliability of the backup process. More specifically, embodiments of the invention may concurrently generate backups by generating groupings of the virtual machines and ordering each grouping so that backup generation for the virtual machines is performed in a concurrent, predetermined order. To avoid failure of the backup process, the migration of virtual machine(s) from one production host to another is disabled during the backup process. Doing so advantageously improves the efficiency and performance of the backup process and enhances the success rate of data protection jobs employing the backup process. Although the above-discussed backup process is associated with virtual machines, one of ordinary skill in the art would appreciate that the backup process can be applied to other entities (e.g., clients' data, application data, and memory devices such as storage devices and hard drives) without departing from the scope of one or more embodiments disclosed herein.

Figure 1:
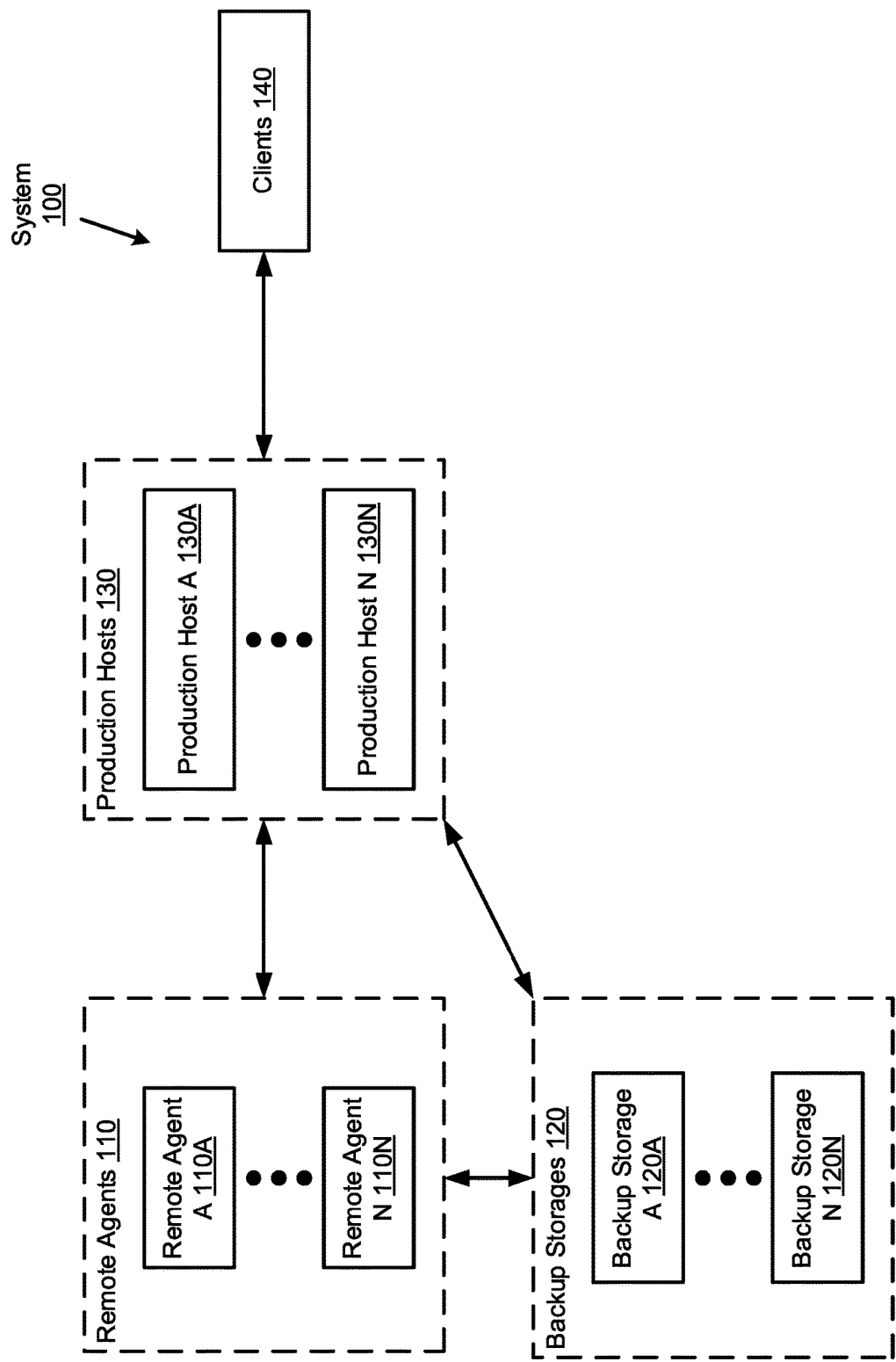
FIG. 1 shows a diagram of a system in accordance with one or more embodiments of the invention.

FIG. 1 shows an example system (100) in accordance with one or more embodiments of the invention. The system may include remote agents (110) that provide backup services to production hosts (130). Backup services may include the generation and storage of backups in backup storages (120) and the restoration of the production hosts using backups stored in the backup storages (120).

In one or more embodiments, each component shown in FIG. 1 may be operably connected to one another (or to additional components (not shown)) via any combination of wired or wireless connections. Each component of the system (100) is discussed below.

In one or more embodiments of the invention, the remote agents (110) may provide backup services to the production hosts (130). The remote agents (110) may provide backup services to the production hosts (130) by orchestrating: (i) generation of backups of the production hosts (130); (ii) storage of backups of the production hosts (130) in the backup storages (120); (iii) consolidation of backup generation requests to reduce or prevent from generation of backups that are not useful for restoration purposes; and (iv) restoration of the production hosts (130) to previous states using backups stored in the backup storages (120). The system may include any number of remote agents (e.g., 110A, 110N) without departing from the scope of one or more embodiments disclosed herein.

Additionally, to provide the aforementioned backup services, the remote agents (110) may include functionality to generate and issue instructions to any component of the system (100) of FIG. 1. In one or more embodiments, the remote agents (110) may generate such instructions in accordance with backup schedules that specify when backups are to be generated. The remote agents (110) may also generate instructions in response to requests for backup generations from other entities.

In one or more embodiments of the invention, the remote agents (110) may be implemented as computing devices. A computing device may be, for example, a mobile phone, a tablet computer, a laptop computer, a desktop computer, a server, a distributed computing system, or a cloud resource. The computing device may be other types of devices without departing from the scope of one or more embodiments disclosed herein. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the remote agents (110) described throughout this application (e.g., all, or a portion, of the methods illustrated in FIGS. 4A-4D). For additional details regarding a computing device, refer to the computing device (600) described below in reference to FIG. 6.

In one or more embodiments of the invention, the remote agents (110) may also be implemented as logical devices. The logical devices may utilize the computing resources of any number of computing devices and thereby provide the functionality of the remote agents (110) described throughout this application (e.g., all, or a portion, of the methods illustrated in FIGS. 4A-4D).

In one or more embodiments of the invention, the backup storages (120) may provide data storage services. For example, the backup storages (120) may store backups of the production hosts (130). The backup storages (120) may also provide copies of previously stored backups of the production hosts (130). The system may include any number of backup storages (e.g., 120A, 120N) without departing from the scope of one or more embodiments disclosed herein.

In one or more embodiments of the invention, the backup storages (120) may also be implemented as computing devices. A computing device may be, for example, a mobile phone, a tablet computer, a laptop computer, a desktop computer, a server, a distributed computing system, or a cloud resource. The computing device may be other types of devices without departing from the scope of one or more embodiments disclosed herein. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the backup storages (120) described throughout this application. Additional details regarding the computing device (600) are described below in reference to FIG. 6.

In one or more embodiments of the invention, the backup storages (120A, 120N) may also be implemented as logical devices. A logical device may utilize the computing resources of any number of computing devices and thereby provide the functionality of the backup storages (120) described throughout this application.

In one or more embodiments of the invention, the production hosts (130) may provide services to the clients (140). For example, the production hosts (130) may host any number of applications that provide application services to the clients (140). Application services may include any type of computer-implemented services such as, but are not limited to: database services; electronic communication services; instant messaging services; file storage services; etc. The system may include any number of production hosts (e.g., 130A, 130N) without departing from the scope of one or more embodiments disclosed herein.

Each of the production hosts (e.g., 130A, 130N) may provide the above-discussed application services by hosting applications. Each of the production hosts may host any number of applications. Additionally, different production hosts may host the same number of applications or different numbers of applications. Different production hosts may also host similar or different applications.

In one or more embodiments of the invention, the production hosts (130) may host virtual machines that host the above-discussed applications. Each of the production hosts (130) may host any number of virtual machines that, in turn, host any number of applications.

In one or more embodiments of the invention, the production hosts (130) may perform portions of a backup generation process. For example, the production hosts (130) may generate backups under the direction of the remote agents (110). In one or more embodiments of the invention, the production hosts (130) may include functionality to consolidate multiple backup generation requests so that duplicative backups are not generated, since duplicative backups are not useful for restoration purposes.

In one or more embodiments of the invention, the production hosts (130) may include functionality to generate multiple backups in parallel. Alternatively, the product hosts (130) may include functionality to generate multiple backups in an overlapping manner. For example, the production hosts (130) may each host multiple backup generation processes that each manages the generation of a respective backup. Each of the multiple backup generation processes may operate concurrently thereby causing multiple backups to be generated in parallel or in an overlapping manner.

In one or more embodiments of the invention, the production hosts (130) may also be implemented as computing devices. A computing device may be, for example, a mobile phone, a tablet computer, a laptop computer, a desktop computer, a server, a distributed computing system, or a cloud resource. The computing device may be other types of devices without departing from the scope of one or more embodiments disclosed herein. The computing device may include one or more processors, memory (e.g., random access memory), and persistent storage (e.g., disk drives, solid-state drives, etc.). The persistent storage may store computer instructions, e.g., computer code, that when executed by the processor(s) of the computing device cause the computing device to perform the functions of the production hosts (130) described throughout this application (e.g., all, or a portion, of the methods illustrated in FIGS. 4A-4D).

In one or more embodiments of the invention, the production hosts (130) may also be implemented as logical devices. A logical device may utilize the computing resources of any number of computing devices to provide the functionality of the production host (130) described throughout this application (e.g., all, or a portion, of the methods illustrated in FIGS. 4A-4D). For additional details regarding the production hosts (130), refer to FIG. 2.

In one or more embodiments of the invention, the clients (140) may interact with the production hosts (130). For example, the clients (140) may utilize application services provided by the production hosts (130). When the clients (140) interact with the production hosts (130), data that is relevant to the clients (140) may be stored on the production hosts (130). For example, consider a scenario in which the production hosts (130) host a database utilized by the clients (140). In this scenario, the database may be a customer database associated with customers of the clients (140). When a new customer is identified, the clients (140) may add information regarding the new customer to the database. By doing so, data that is relevant to the clients (140) may be stored in the production hosts (130). This is done because the clients (140) may desire access to the data regarding the new customer at some point in time.

In one or more embodiments of the invention, the clients (140) may include functionality to use services provided by the production hosts (130). For example, the clients (140) may host local applications that interact with applications hosted by the production hosts (130).

In one or more embodiments of the invention, the clients (140) may be implemented as computing devices. A computing device may be, for example, a mobile phone, a tablet computer, a laptop computer, a desktop computer, a server, a distributed computing system, or a cloud resource. The computing device may be other types of devices without departing from the scope of one or more embodiments disclosed herein. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the clients (140) described throughout this application (e.g., all, or a portion, of the methods illustrated in FIGS. 4A-4D).

In one or more embodiments of the invention, the clients (140) may also be implemented as logical devices. A logical device may utilize the computing resources of any number of computing devices to provide the functionality of the clients (140) described throughout this application.

While the system of FIG. 1 has been illustrated as including a limited number of components, the system may include additional components (not shown), fewer components, or different components (not shown) without departing from the scope of one or more embodiments disclosed herein.

Figure 2:
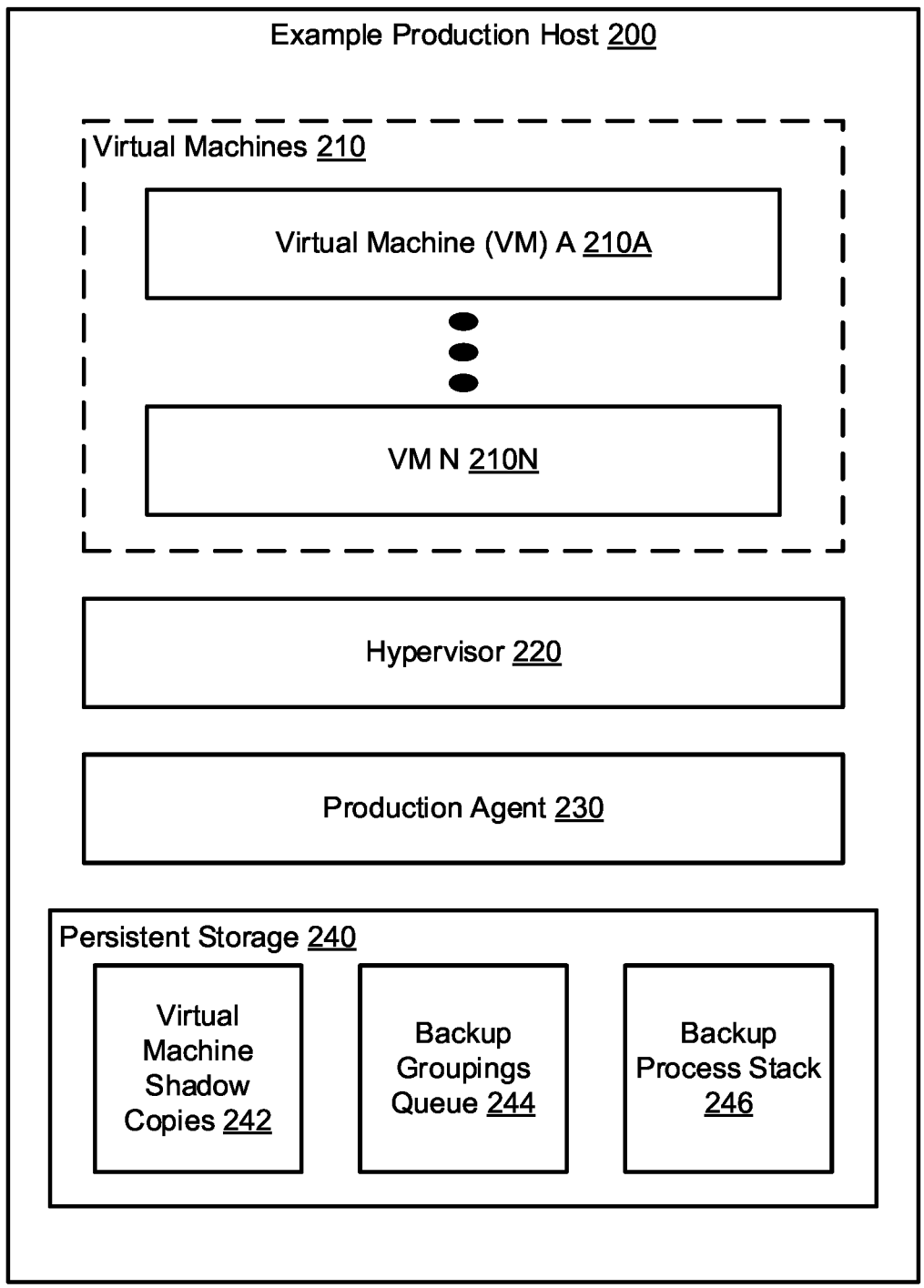
FIG. 2 shows a diagram of an example production host in accordance with one or more embodiments of the invention.

As discussed above, the production hosts (130) may generate backups of data that is relevant to clients or other entities. FIG. 2 shows a diagram of an example production host (200) in accordance with one or more embodiments of the invention. The example production host (200) may be similar to the production hosts (130) discussed above in reference to FIG. 1.

To provide the functionality of the production hosts (130) discussed above, the example production host (200) may include virtual machines (210), a hypervisor (220), a production agent (230), and persistent storage (240). Each of these components of the example production host (200) is discussed below.

In one or more embodiments of the invention, the virtual machines (210) are logical entities executed using computing resources of the example production host (200) or other computing devices (e.g., mobile phones, tablet computers, laptop computers, desktop computers, servers, distributed computing systems, cloud resources, etc.). Each of the virtual machines (e.g., 210A, 210N) may be performing similar or different processes.

In one or more embodiments, the virtual machines (210) (and the applications hosted by the virtual machines) may generate data that is stored in the persistent storage (240). In one or more embodiments, the virtual machine data may reflect the state of a virtual machine (210).

In one or more embodiments of the invention, the virtual machines (210) may provide services to clients (e.g., 140, FIG. 1). For example, the virtual machines (210) may host instances of databases, email servers, or other applications. The virtual machines (210) may host other types of applications without departing from the scope of one or more embodiments disclosed herein. Additionally, the applications hosted by the virtual machines (210) may provide application services to clients (e.g., 140 in FIG. 1).

In one or more embodiments of the invention, the virtual machines (210) may also be implemented as computer instructions, e.g., computer code, stored on a persistent storage (e.g., 240) that when executed by a processor of the example production host (200) cause the example production host (200) to provide the functionality of the virtual machines (210) described throughout the application (e.g., all, or a portion, of the methods illustrated in FIGS. 4A-4D).

In one or more embodiments of the invention, the hypervisor (220) may be configured to orchestrate the operation of the virtual machines (210) by allocating computing resources (e.g., CPU, memory, etc.) to each of the virtual machines (210).

In one or more embodiments of the invention, the hypervisor (220) may be a physical device including circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application (e.g., all, or a portion, of the methods illustrated in FIGS. 4A-4D).

In one or more of embodiments of the invention, the hypervisor (220) may be implemented as computer instructions, e.g., computer code, stored on a persistent storage (e.g., 240) that when executed by a processor of the example production host (200) cause the example production host (200) to provide the functionality of the hypervisor (220) described throughout the application (e.g., all, or a portion, of the methods illustrated in FIGS. 4A-4D).

In one or more embodiments of the invention, the production agent (230) may be configured to locally orchestrate the performance of backup services for the virtual machines (210). More specifically, the production agent (230) may orchestrate the performance of backup services under the direction of remote agents (e.g., 110, FIG. 1). For example, the remote agents may send instructions to the production agent (230) regarding: when backups of the virtual machines (210) should be generated; where the generated backups should be stored; and when a virtual machine should be restored to a previous state.

To orchestrate the performance of backup services, the production agent (230) may issue commands to the hypervisor (220) to control the operation of the virtual machine (210) when a backup of one of the virtual machines (210) is being generated, or when a restoration of one of the virtual machines (210) is being performed.

To locally orchestrate the generation of backups of the virtual machines (210), the production agent (230) may generate virtual machine shadow copies (242) of virtual machine data, stored in the persistent storage (240). In one or more embodiments, a virtual machine shadow copy (242) may reflect virtual machine data of a virtual machine (210) at a particular point in time. Furthermore, a backup for a virtual machine may be generated using a respective virtual machine shadow copy (242) by either: (i) including data that is representative of the state of the virtual machine at the point in time the virtual machine shadow copy was generated (e.g., data that reflects a state of the virtual machine); or (ii) including data that is representative of the difference between the state of the virtual machine at a first point in time the virtual machine shadow copy was generated and a second state of the virtual machine at a second point in time prior to the first point in time (e.g., data that reflects a change in the state of the virtual machine).

In one or more embodiments of the invention, the production agent (230) is a hardened entity, i.e., not modifiable by an entity that is remote to the example production host (200) on which the production agent (230) is executing. In one or more embodiments of the invention, the production agent (230) may have a set, finite number of predefined functions that may be invoked by a remote entity. In one or more embodiments of the invention, the production agent (230) may not be configurable by modifying settings or associated configuration files by a remote entity.

In one or more embodiments of the invention, the production agent (230) may also be implemented as computer instructions, e.g., computer code, stored on a persistent storage (e.g., 240) that when executed by a processor of the example production host (200) cause the example production host (200) to provide the functionality of the production agent (230) described throughout the application (e.g., all, or a portion, of the methods illustrated in FIGS. 4A-4D).

In one or more embodiments of the invention, the production agent (230) may be a physical device including circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application (e.g., all, or a portion, of the methods illustrated in FIGS. 4A-4D).

In one or more embodiments of the invention, the persistent storage (240) may be a physical computer readable storage medium. For example, the persistent storage (240) may be (or may include) hard disk drives, solid-state drives, tape drives, or other physical storage media. The persistent storage (240) may be other types of digital storage without departing from the scope of one or more embodiments disclosed herein. Additionally, the persistent storage (240) may be a virtualized storage without departing from the scope of one or more embodiments disclosed herein.

In one or more embodiments of the invention, the persistent storage (240) may store data such as, for example, the virtual machine shadow copies (242), a backup groupings queue (244), and a backup process stack (246). Each of these data structures is discussed below.

In one or more embodiments of the invention, the virtual machine shadow copies (242) may be data structures that include copies of virtual machine data. The virtual machine shadow copies (242) may be generated by the production agent (230) in response to one or more backup generation requests for the virtual machines (210). Additionally, backups of the virtual machines (210) may be generated and stored in the backup storage (e.g., 120, FIG. 1) using the virtual machine shadow copies (242).

In one or more embodiments of the invention, the backup groupings queue (244) may be a data structure that includes groupings of virtual machines (210) identified by backup generation requests. For example, the virtual machines (210) may be grouped based on priority characteristics of the virtual machines, as discussed below. In one or more embodiments of the invention, the production agent (230) may order the virtual machines (210) in backup generation requests and place them in groupings of the backup groupings queue (244) using the priority characteristics of each virtual machine (210). These priority characteristics may include, for example, a size of the virtual machine (210) or a user-assigned rank of the virtual machine (210). Other priority characteristics may be used to group the virtual machines (210) without departing from the scope of one or more embodiments disclosed herein.

In one or more embodiments of the invention, the backup process stack (246) may be a data structure that includes information for generating backups in parallel. Additionally, the backup process stack (246) may be a data structure that includes information for generating backups in an overlapping manner. In one or more embodiments, the information may include consolidated groupings of the backup groupings queue (244). The backup process stack (246) may include each virtual machine (210) identified in the backup generation requests once. In contrast, the backup groupings queue (244) may include the virtual machines (210) identified in the backup generation requests any number of times as specified by the backup generation requests.

For example, two backup generation requests may each identify the same virtual machine (e.g., 210A). As a result, the backup groupings queue (244) may include two groupings that each identifies the same virtual machine (e.g., 210A), regardless of any repeating virtual machines (210). In contrast, the backup process stack (246) may include a backup process stack entry that is a consolidation of two backup groupings. The backup process stack entry may identify each virtual machine once. Additional details regarding the backup process stack (246) are described below in reference to FIG. 3.

While illustrated to include only a limited number of components, the example production host (200) may include, fewer, and additional components from those illustrated in FIG. 2 without departing from the scope of one or more embodiments disclosed herein.

FIG. 3 shows a diagram of an example backup process stack (300) in accordance with one or more embodiments of the invention. The example backup process stack (300) may be similar to the backup process stack (246, FIG. 2) discussed above.

In one or more embodiments of the invention, the example backup process stack (300) may be a data structure that includes information used for generating backups of virtual machines in parallel or in an overlapping manner. In one or more embodiments, the example backup process stack (300) may include any number of backup process stack entries (e.g., 310A, 310N). In one or more embodiments, each backup process stack entry (e.g., 310A, 310N) may include any number of virtual machine identifiers (312). Each portion of the example backup process stack (300) is discussed below.

In one or more embodiments of the invention, each of the virtual machine identifiers (e.g., 312A, 312N) corresponds to a respective virtual machine to be backed up. Each virtual machine identifier (312A, 312N) may identify a unique virtual machine. For example, a virtual machine specified by a virtual machine identifier (312A, 312N) in the example backup process stack (300) may not be specified by any other virtual machine identifier in the example backup process stack (300).

In one or more embodiments of the invention, each backup process stack entry (310A, 310N) specifies an order in which backups of virtual machines are generated. The virtual machine identifiers (311) in each backup process stack entry (310A, 310N) may be organized in a predetermined order. The production host may perform a backup of a virtual machine by identifying a virtual machine specified by a first virtual machine identifier (e.g., 312A) of a backup process stack entry (e.g., 310A), generating a backup of the virtual machine, identifying a virtual machine of a second virtual machine specified by a second virtual machine identifier, generate a backup of the second machine, and repeat the process until all virtual machines specified by the virtual machine identifiers (312A, 312N) of the backup process stack entry (310A, 310N) are backed up.

In one or more embodiments of the invention, each backup process stack entry (310A, 310N) may be backed up concurrently. In other words, the production agent may generate more than one backup of virtual machines by performing the backups specified by each backup process stack entry (310A, 310N) at the same time. For example, there may be multiple instances, each performing the above-discussed backup process, that may be generating backups for each of the backup process stack entries (310A, 310N). By doing so, backups may be generated in a parallel or in an overlapping manner. In one or more embodiments, the number of instances may be the same as the number of backup process stack entries.

While the various steps in the following flowcharts are presented and described sequentially, one of ordinary skill in the relevant art will appreciate that some or all of the steps in any of FIGS. 4A-4D described below may be executed in a different order, may be combined or omitted, and some or all steps in any of FIGS. 4A-4D may be executed in parallel.

Figure 4A:
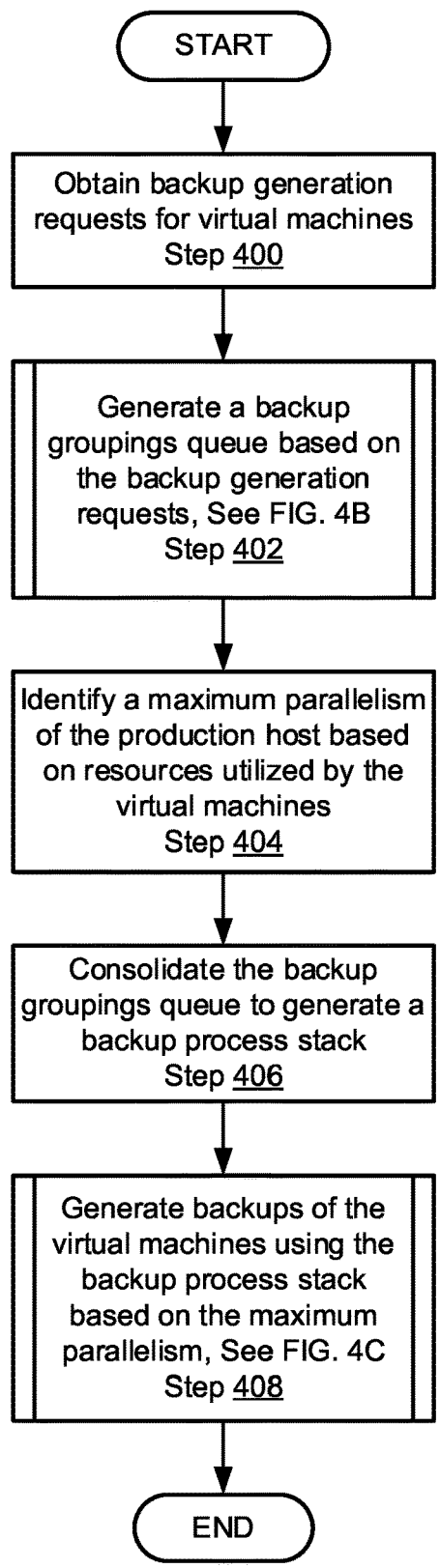
FIG. 4A shows a flowchart of a method of performing concurrent backups of virtual machines in accordance with one or more embodiments of the invention.

As discussed above, a production host may concurrently generate backups for multiple virtual machines (e.g., 210, FIG. 2). FIG. 4A shows a flowchart of a method in accordance with one or more embodiments of the invention. The method depicted in FIG. 4A may be used to generate backups of virtual machines in accordance with one or more embodiments of the invention. The method shown in FIG. 4A may be performed by, for example, production hosts (e.g., 130, FIG. 1). Other components of the system illustrated in FIG. 1 may perform the method of FIG. 4A without departing from the scope of one or more embodiments disclosed herein.

In Step 400, backup generation requests for virtual machines are obtained.

In one or more embodiments of the invention, one or more of the backup generation requests are obtained from a client(s), which may be operated by one or more users. The users may request that backups of virtual machines be generated by sending requests for such generations via the clients to the production hosts. Additionally, the backup generation requests may include any number of backup generation requests from any number of clients operated by any number of users.

In one or more embodiments of the invention, one or more of the backup generation requests are obtained from remote agents. The remote agents may send such requests in accordance with backup policies that specify when backups are to be generated. Additionally, the backup generation requests may include any number of backup generation requests from any number of remote agents.

In one or more embodiments of the invention, each backup generation request specifies the identities (e.g., using the above-discussed virtual machine identifiers) of virtual machines for which backups are to be generated.

In one or more embodiments of the invention, the backup generation requests are obtained over a predetermined period of time. For example, the backup generation requests may be obtained over a period of ten minutes. During the predetermined period of time, backup generation requests may be obtained and aggregated for future use. The predetermined period of time may be of any duration without departing from the scope of one or more embodiments disclosed herein. Backup generations may be performed after the predetermined period of time.

In one or more embodiments of the invention, the backup generation requests are obtained over a variable period of time. The variable period of time may have a duration based on, for example, the number of backup generation requests meeting a predetermined threshold. The variable period of time may be based on other factors without departing from the scope of one or more embodiments disclosed herein. For example, the variable period of time may have a predetermined duration unless a number of backup generation requests received before the end of the predetermined duration meets a predetermined threshold. In such a scenario, the variable period of time may be the period of time during which the number of backup generation requests meeting the predetermined threshold is obtained.

In Step 402, a backup groupings queue is generated based on the backup generation requests.

In one or more embodiments of the invention, the backup groupings queue is generated by identifying the backup generation requests, identifying priority characteristics of the virtual machines specified in the backup generation requests, and generating an ordering of the virtual machines based on the priority characteristics. The generated ordering may be used to populate the backup groupings queue.

Figure 4B:
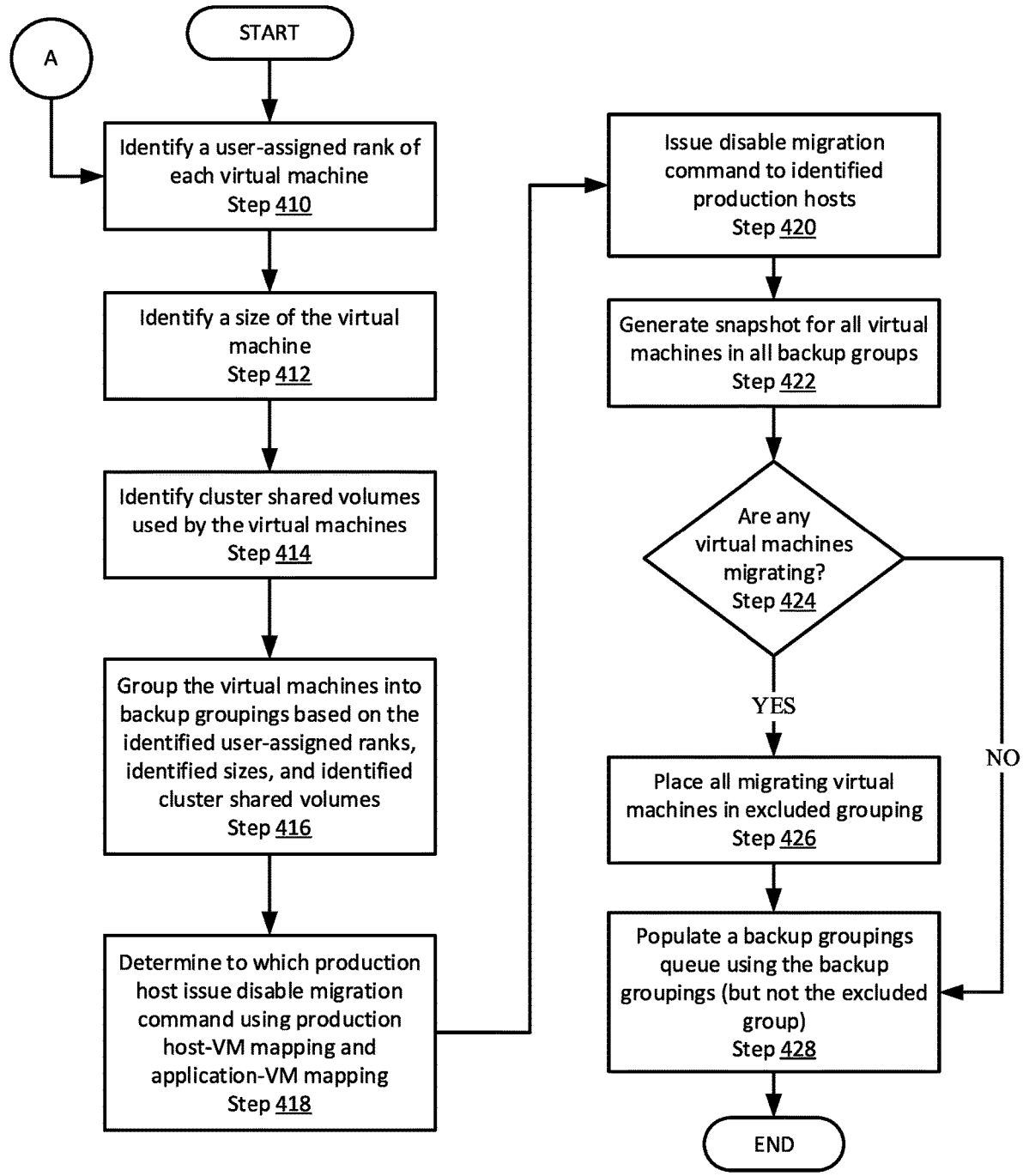
FIG. 4B shows a flowchart of a method of generating a backup groupings queue in accordance with one or more embodiments of the invention.

In one or more embodiments of the invention, the backup groupings queue is generated using the method illustrated in FIG. 4B. The backup groupings queue may be generated via other methods without departing from the scope of one or more embodiments disclosed herein.

In Step 404, a maximum parallelism of the production host is identified based on the computing resources utilized by the virtual machines.

In one or more embodiments of the invention, the maximum parallelism of the production host that is performing a backup process is identified based on the computing resources utilized by the production host. Each virtual machine of the production host may be allocated a portion of the computing resources that the virtual machine may use. The maximum parallelism may be estimated by identifying the computing resources being used by the virtual machines and comparing the used computing resources to the total computing resources of the production host.

For each of the virtual machines that are included in the backup generation request, a backup generation estimate may be generated to estimate an amount of computing resources required to generate a backup of the virtual machine. The available computing resources and the backup generation estimates of the virtual machines, for which backups are to be generated, may be used to estimate a maximum number of backups that can be generated at a time (i. e. the maximum parallelism). For example, the estimate of the available computing resources of the production host may be divided by the average of the backup generation estimates to calculate the maximum parallelism. Other methods for determining the maximum number of backups to be generated concurrently (i.e. the maximum parallelism) may be used without departing from the scope of one or more embodiments disclosed herein.

In Step 406, the backup groupings queue is consolidated to generate a backup process stack.

In one or more embodiments of the invention, the backup groupings queue is consolidated by identifying each backup groupings that specifies a virtual machine specified by another backup grouping. In other words, duplicate backup generation requests are identified. The duplicates may be merged to obtain a backup process stack entry. This process may be repeated to obtain all of the backup process stack entries of the backup process stack.

In one or more embodiments of the invention, the backup groupings queue is consolidated by removing duplicate virtual machine identifiers from the backup groupings queue. The production host performing the backups may identify two or more copies of virtual machine identifiers that specify the same virtual machine and remove all extra copies while leaving only one of the virtual machine identifiers specifying the same virtual machine.

In one or more embodiments of the invention, the backup process stack is populated with the consolidated backup groupings queue. Each consolidated backup groupings queue may be a backup process stack entry.

In Step 408, backups of the virtual machines are generated using the backup process stack based on the maximum parallelism.

In one or more embodiments of the invention, a number of processes for generating backups may be instantiated. The number may be equal to the maximum parallelism. Each of the processes may be assigned to generate backups of virtual machines specified by the backup process stack entries. For example, each process may be assigned to generate backups of virtual machines specified by a particular entry of the backup process stack. Additionally, each process may be assigned to different backup process stack entries. Each of the processes may be operative in a parallel or in an overlapping manner.

In one or more embodiments of the invention, the backups are generated by generating a first backup of each virtual machine specified by a number of backup process stack entries that matches the maximum parallelism, and by repeating the backup generation for each virtual machine of each backup process stack entry of the backup process stack. In other words, any number of backup process entries matching the number of maximum parallelism may be processed at one time. Each backup process stack entry may also be processed by generating the backups of virtual machines in the order specified by the backup process stack entry. When a backup process stack entry is completed, an unprocessed backup process stack entry may be processed until all of the backup process stack entries have been processed.

In one or more embodiments of the invention, the backups are generated using the method illustrated in FIG. 4C, which will be described in more detail below. The backups may be generated via other methods without departing from the scope of one or more embodiments disclosed herein.

In one or more embodiments, the method may end following Step 408 of FIG. 4A.

Turning now to FIG. 4B, FIG. 4B shows a flowchart of a method in accordance with one or more embodiments of the invention. The method depicted in FIG. 4B may be used to generate a backup groupings queue in accordance with one or more embodiments of the invention. The method shown in FIG. 4B may be performed by, for example, production hosts (130, FIG. 1). Other components of the system illustrated in FIG. 1 may perform the method of FIG. 4B without departing from the scope of one or more embodiments disclosed herein.

In Step 410, a user-assigned rank of each virtual machine is identified.

In one or more embodiments of the invention, a user-assigned rank is a priority characteristic assigned by a user to a virtual machine prior to sending a backup generation request. The user-assigned rank of a virtual machine may be relative to the other virtual machines in the backup generation request. The user-assigned ranking of a virtual machine may be a highest ranking, lowest ranking, or any intermediate ranking between the highest and lowest ranking. The user-assigned rank may be identified for each virtual machine of each backup generation request obtained by the production host. In one or more embodiments, the user may not assign a user-assigned rank to every virtual machine of the backup generation request. In other words, not every virtual machine may have a user-assigned rank.

In Step 412, a size of each virtual machine is identified.

In one or more embodiments of the invention, the size of a virtual machine is a priority characteristic that specifies an amount of data that a backup of the virtual machine may include after being generated. For example, a user may request a partial backup of 50%. The virtual machine to be partially backed up may include 10 GB of data. Consequently, the production host may identify a size of the virtual machine as 5 GB because 5 GB is 50% of 10 GB. The size of a virtual machine may be identified for each virtual machine specified by each backup generation request.

In Step 414, cluster shared volumes used by the virtual machine, that are to be backed up, are identified.

In one or more embodiments of the invention, a cluster shared volume is a priority characteristic that specifies a portion of computing resources that are shared by a group of virtual machines. The portion of computing resources may be used by the virtual machines to process and store data. Each virtual machine may be associated with a cluster shared volume based on a portion of computing resources used by the virtual machine.

For example, a cluster shared volume may be a disk that multiple virtual machines may have access to for data storage and data read purposes. If backups of multiple virtual machines utilizing a cluster shared volume are performed concurrently, the cluster shared volume may limit the rate at which the backups may be generated. In other words, it may not be possible to effectively parallelize generation of backups of virtual machines that utilize a shared resource. As a result, one or more embodiments of the invention may advantageously reduce the likelihood of shared resources preventing backup generation parallelization by identifying such virtual machines prior to generating backups.

In one or more embodiments of the invention, the cluster shared volumes are identified by the portion of the computing resources used by the virtual machines specified in the backup generation requests.

In Step 416, the virtual machines are grouped into backup groupings based on the identified user-assigned ranks, identified sizes, and identified cluster shared volumes.

In one or more embodiments of the invention, the virtual machines are grouped by reordering the virtual machines in each backup generation request based on the identified priority characteristics discussed above. A backup groupings queue may be reordered by assigning a virtual machine identifier with the highest user-assigned rank as the first virtual machine in the backup groupings queue. For example, the lowest user-assigned rank of a virtual machine identifier may be used to place the virtual machine in last place. Moreover, any virtual machines with intermediate user-assigned ranks may be ordered based on the size of the virtual machine. For example, a virtual machine of the intermediate user-assigned rank with a smaller size may be placed higher in the order than a virtual machine of the intermediate user-assigned rank with a larger size. Consequently, any virtual machine without an identified user-assigned rank may be ordered by size similar to the virtual machines of the intermediate user-assigned rank.

In one or more embodiments of the invention, the cluster shared volumes are used for further reordering so that backups of virtual machines in the same cluster shared volume are not generated at the same time. For example, a grouping may specify a first virtual machine being first in the backup groupings queue. Another grouping may specify a second virtual machine that is in the same cluster shared volume as the first virtual machine. The second virtual machine may be first in its respective backup groupings queue. To avoid having the backups of the two virtual machines being generated at the same time, the production host may place the second virtual machine in a different place in its respective backup groupings queue (i.e. in second place). While described with respect to a shared cluster volume, embodiments of the invention may reorder the backups for virtual machines based on any type of shared resources other than shared cluster volumes without departing from the scope of one or more embodiments disclosed herein.

In Step 418, it is determined to which production host a disable migration command will be issued using production host-virtual machine mapping or application-virtual machine mapping.

In one or more embodiments of the invention, it is determined to which production host the disable migration command will be issued using production host-virtual machine mapping. In particular, each production host may be allocated one or more virtual machines. The production host-virtual machine mapping maps which virtual machine is allocated to which production host. If a virtual machine is migrating from a production host to another production host, the production host-virtual machine mapping illustrates the source production host and the destination production host. In one or more embodiments of the invention, before performing the backup process, the disable migration command will be issued to all production hosts that are potentially involved in migration of a virtual machine as a source or destination. More specifically, a production host is potentially involved in migration of a virtual machine if that production host is either a source or a destination of a migrating virtual machine. Additionally, a production host may also be involved in the migration of a virtual machine if the production host is associated with a virtual machine that is hosting an enterprise cluster application with virtual machines of other production hosts, and one of these virtual machines of these production hosts is a migrating virtual machine. The concept of sharing virtual machines to host an enterprise cluster application is discussed in more detail below.

In one or more embodiments of the invention, it is determined to which production host the disable migration command will be issued using application-virtual machine mapping. Sometimes one or more virtual machines from different production hosts are hosting enterprise cluster application, such as SQL, AAG, Exchange, etc. To prevent data inconsistency, the virtual machines that are hosting these sorts of applications need to be backed up together. Therefore, if one of the virtual machines that is hosting such applications has potential of being migrated, the disable migration command will need to be issued to all of the production hosts that share virtual machines hosting the same enterprise cluster application.

In one or more embodiments of the invention, the application-virtual machine mapping maps which virtual machine is allocated (e.g., assigned) to host an application (e.g., an enterprise cluster application). If one of these virtual machines is migrating from a production host to another production host, the application-virtual machine mapping illustrates which virtual machine has the potential of migration. In one or more embodiments, before performing the backup process, the disable migration command will be issued to all production hosts that are potentially involved in migration of a virtual machine, i.e., production hosts that share one or more virtual machines for hosting the enterprise cluster application with the migrating virtual machine.

In Step 420, disable migration command is issued to the identified production hosts in the Step 418.

In one or more embodiments of the invention, after identifying to which production hosts to issue the disable migration command using the production host-virtual machine mapping or application-virtual machine mapping, the disable migration command will be issued. In one or more embodiments, the disable migration command may only disable future migrations from and to those production hosts to which the disable migration command is issued. In one or more embodiments, a disable migration command cannot disable an ongoing migration of a virtual machine.

In Step 422, a shadow copy is generated for all of the virtual machines that are included in the backup groupings.

In one or more embodiments of the invention, after identifying which virtual machines need to be backed up, a shadow copy may be generated for all of the virtual machines that are included in the backup process. The shadow copy (also referred to herein as the "virtual machine shadow copy") can be generated in the virtual machine level or in the production host level. In one or more embodiments, the shadow copy may be stored in both levels. In one or more embodiments of the invention, the production agent may generate virtual machine shadow copies of virtual machine data and store it in persistent storage. In one or more embodiments, a virtual machine shadow copy may reflect virtual machine data of a virtual machine at a particular point in time. Furthermore, a backup for a virtual machine may be generated using a respective virtual machine shadow copy by either: (i) including data that is representative of the state of the virtual machine at the point in time the virtual machine shadow copy was generated (e.g., data that reflects a state of the virtual machine); or (ii) including data that is representative of the difference between the state of the virtual machine at the point in time the virtual machine shadow copy was generated and a second state of the virtual machine at a second point in time prior to the point in time the virtual machine shadow copy was generated (e.g., data that reflects a change in the state of the virtual machine).

In one or more embodiments of the invention, failure in generation of a shadow copy of a virtual machine indicates that the virtual machine is migrating at the time the shadow copy is being generated. Additionally, failure in generation of a shadow copy of a production host indicates that the production host is either the source or the destination of an ongoing migration of a virtual machine at the time the shadow copy is being generated.

In Step 424, it is determined whether any of the virtual machines are involved in migration or not.

In one or more embodiments of the invention, after generating the shadow copy of the virtual machines that need to be backed up, it is determined whether any of the virtual machines are involved in migration by identifying failures that occurred during the shadow copy generation process. To perform a backup process, shadow copies are generated from the production hosts or from the virtual machines that need to be backed up. If a virtual machine is migrating from a production host to another production host, the shadow copy of that virtual machine or the shadow copy of the source production host or the destination production host of that migrating virtual machine will fail.

In Step 426, all of the identified migrating virtual machines are placed in an excluded grouping (also referred to herein as an "excluded group").

In one or more embodiments of the invention, after identifying the migrating virtual machines, these migrating virtual machines will be removed from their associated backup groupings that were determined in the above-discussed Step 416. These migrating virtual machines will also be placed in an excluded group. Then, the backup groupings that are generated in Step 416 will be reordered to exclude the virtual machines that are now placed in the excluded group.

In Step 428, a backup groupings queue is populated using the backup groupings.

In one or more embodiments of the invention, the backup groupings queue may be populated by adding the backup groupings obtained in Step 426 to the backup groupings queue that is generated in Step 406.

In one or more embodiments, the method may end following Step 428.

Figure 4C:
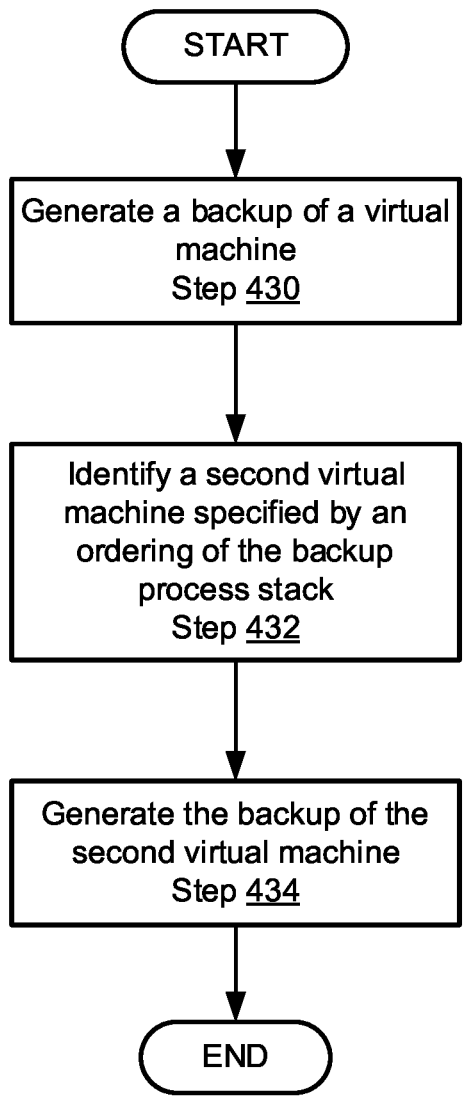
FIG. 4C shows a flowchart of a method of generating backups of the virtual machines in accordance with one or more embodiments of the invention.

Turning now to FIG. 4C, FIG. 4C shows a flowchart of a method in accordance with one or more embodiments of the invention. The method depicted in FIG. 4C may be used to generate backups in accordance with one or more embodiments of the invention. The method shown in FIG. 4C may be performed by, for example, production hosts (130, FIG. 1). Other components of the system illustrated in FIG. 1 may perform the method of FIG. 4C without departing from the scope of one or more embodiments disclosed herein.

The method shown in FIG. 4C may be performed in a parallel or in an overlapping manner for each backup process stack entry processed by the production host.

In Step 430, a backup of a virtual machine is generated.

In one or more embodiments of the invention, the backup of the first virtual machine is generated by quiescing the virtual machine, generating a virtual machine shadow copy of the virtual machine, generating a backup based on the virtual machine shadow copy, and sending the backup to a backup storage. The virtual machine may be specified by a backup process stack entry as the highest placed virtual machine in the backup process stack entry.

In Step 432, a second virtual machine specified by an ordering of the backup process stack is identified.

In one or more embodiments of the invention, the second virtual machine is the next highest-placed virtual machine in the backup process stack entry. The production host may identify the second virtual machine by identifying the order or the backup process stack entry and identifying the virtual machine that follows the virtual machine of Step 430 in the identified order.

In Step 434, a backup of the second virtual machine is generated after the backup of the first virtual machine is generated.

In one or more embodiments of the invention, the backup of the second virtual machine is generated by quiescing the virtual machine, generating a virtual machine shadow copy of the second virtual machine, merging the virtual machine shadow copies to generate a single data structure, and sending the single data structure to a backup storage.

In one or more embodiments, the method may end following Step 434.

Figure 4D:
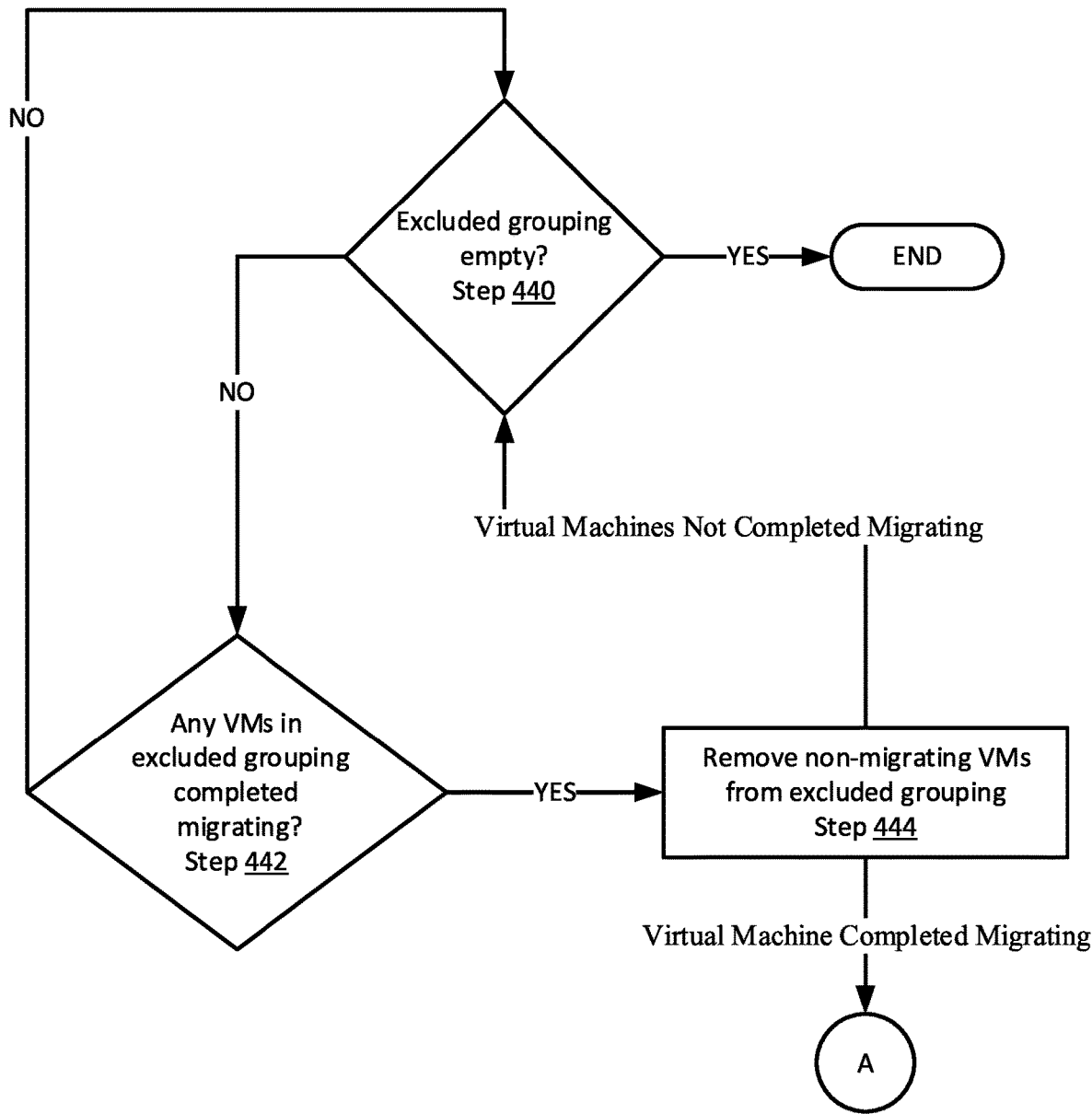
FIG. 4D shows a flowchart of a method of processing virtual machines assigned to an excluded group in accordance with one or more embodiments of the invention.

Turning now to FIG. 4D, FIG. 4D shows a flowchart of a method of processing virtual machines assigned to an excluded group in accordance with one or more embodiments of the invention. The method depicted in FIG. 4D may be used to generate backups of virtual machines in accordance with one or more embodiments of the invention. The method shown in FIG. 4D may be performed by, for example, production hosts (130, FIG. 1). Other components of the system illustrated in FIG. 1 may perform the method of FIG. 4D without departing from the scope of one or more embodiments disclosed herein.

In Step 440, it is determined whether an excluded group is empty.

In one or more embodiments of the invention, it is determined whether an excluded group is empty by monitoring whether any virtual machines remain in the excluded group. As discussed above in Steps 424 and 426 of FIG. 4B, the excluded group includes the migrating virtual machines.

In Step 442, it is determined whether any virtual machine in the excluded group completed its migration.

In one or more embodiments of the invention, it is determined whether any virtual machine in the excluded group completed its migration by monitoring the migrating virtual machines that are placed in the excluded group. More specifically, the production host-VM mapping illustrates the mapping of virtual machines with respect to its associated production host. Completion of migration of a migrating virtual machine may be determined by monitoring the virtual machines that are placed in the excluded group as well as using their associated production host-VM mapping.

In Step 444, the virtual machines that are determined to have completed their migration are removed from the excluded group.

In one or more embodiments of the invention, after determining that a virtual machine in the excluded group has completed its migration, that virtual machine will be removed from the excluded group and will be placed in a new backup groupings. Once the virtual machine removed from the excluded group is placed in the new backup groupings, the backup generation is resumed.

To further clarify aspects of embodiments of the invention, a non-limiting example is provided in FIGS. 5A-5E. FIGS. 5A-5E may illustrate portions of a system similar to that of FIG. 1.

EXAMPLE

Figure 5A:
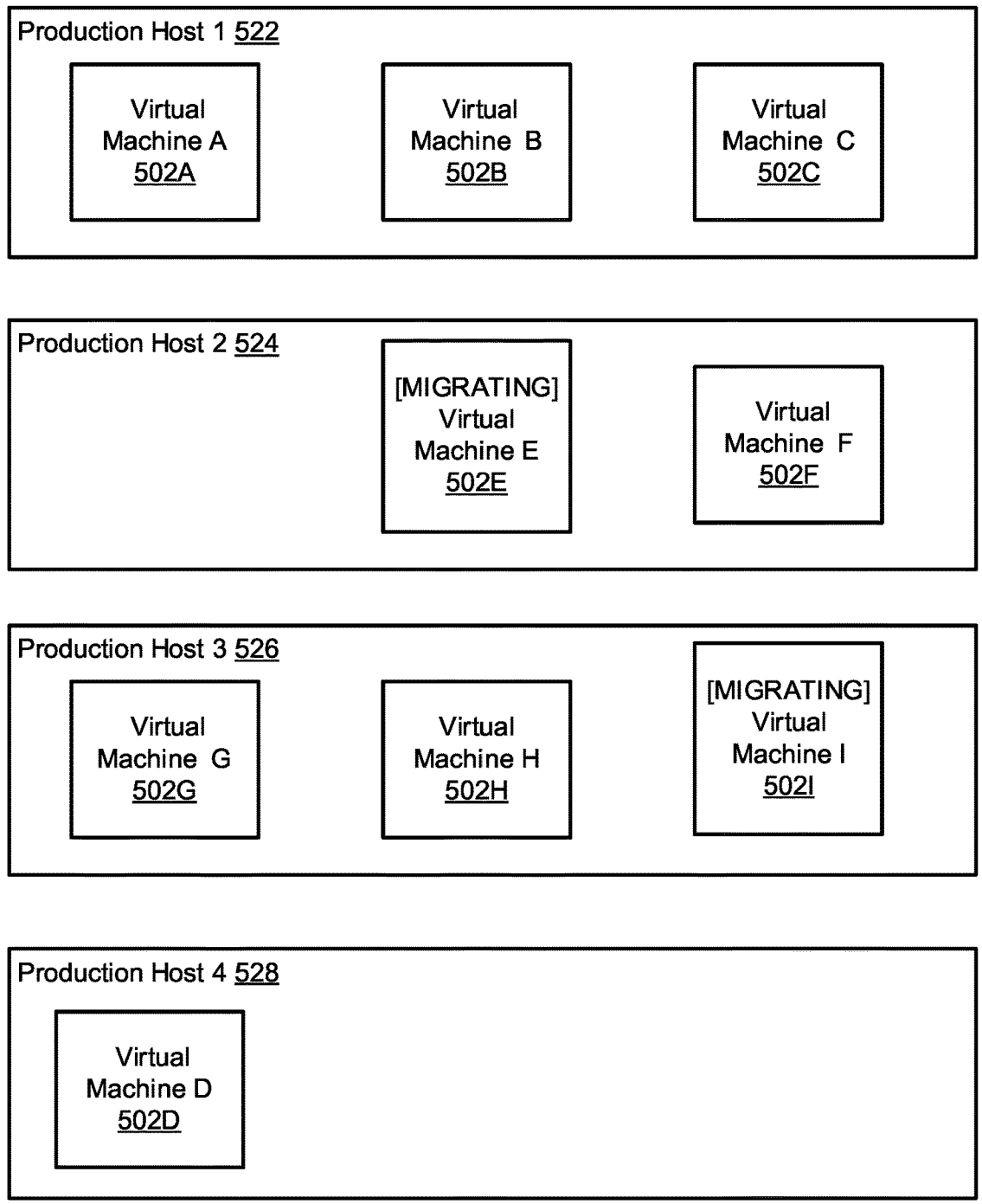

Consider a scenario in which backup generation requests for virtual machines are obtained by a production host within a predetermined time period. FIG. 5A shows a diagram of an example of the virtual machines, and their associated production hosts, that are included in the backup generation request. By way of this example, virtual machines A-C are included in production host 1 (522), virtual machines E and F are included in production host 2 (524), and virtual machines G-I are included in production host 3 (526). Virtual machine D, which is included in production host 4 (528) is not listed in the backup generation request. However, it is illustrated in this example, because virtual machines A and D host an enterprise cluster application together. Virtual machines E (502E) and I (502I) are involved in an ongoing migration to another production host at the time of performing backup process. In particular, virtual machine E (502E) is migrating from production host 2 (524) to production host 3 (526).

FIG. 5B shows an example backup grouping queue (540). This backup grouping queue (540) is a result of steps 410-416 discussed above in FIG. 4B. As shown in FIG. 5B, example backup grouping queue (540) includes three backup groupings 1-3 (542, 544, 546). Backup grouping 1 (542) includes virtual machine identifiers A-C, (512A)-(512C). Backup grouping 2 (544) includes migrating virtual machine identifier E (512E) and virtual machine identifier F (512F). Lastly, backup grouping 3 (546) includes virtual machine identifier G (512G), virtual machine identifier H (512H), and migrating virtual machine identifier I (512I).

Turning now to FIG. 5C, FIG. 5C illustrates production hosts that are identified to have received a disable migration command FIG. 5C also shows that shadow copies are generated from the identified production hosts and their associated virtual machines. These actions are the same as those discussed in steps 418-422 of FIG. 4B. These production hosts are either the production hosts that include virtual machines listed in the backup generation request, or the production hosts including at least one virtual machine that shares the hosting of an enterprise cluster application with at least one other virtual machine that is listed in the backup generation request. Identification of the production hosts that include virtual machines that are listed in the backup generation request is achieved using production host-VM mapping. Alternatively, identification of the production hosts that include at least one virtual machine that shares the hosting of an enterprise cluster application together with at least one other virtual machine that is listed in the backup generation request is achieved using application-VM mapping.

More specifically, in the example shown in FIG. 5C, virtual machines A-C, E, F, and G-I are included in the backup generation request. Virtual machine E (502E) is involved in an ongoing migration from production host 2 (524) to production host 3 (526). Virtual machine I (502I) is involved in an ongoing migration from production host 3 (526) to production host 2 (524). Virtual machine D (502D) and virtual machine A (502A) share the hosting of an enterprise cluster application. Consequently, disable migration commands are issued for each of the production hosts 1-4 (522, 524, 526, 528).

After issuing the disable migration commands, shadow copies are generated from the production hosts 1-4 and their associated virtual machines, i.e., virtual machines A-I. Because virtual machine E (502E) and virtual machine I (502I) are involved in an ongoing migration at the time that the shadow copies are being generated, generation of their shadow copies and their production hosts' shadow copies will fail.

FIG. 5D shows the placing of the migrating virtual machines (e.g., migrating virtual machine identifier E (512E) and migrating virtual machine identifier I (512I)) in an excluded group (548). After placing the migrating virtual machines in the excluded group (548), shadow copies will be generated from production hosts 1-3 shown in FIG. 5C. The generation of these shadow copies will not fail and the generated shadow copies may be used for the backup generation process of the virtual machines remaining in backup groupings 1-3. As a result, data in the virtual machines A-C, F, G, and H can be populated, backed up, and stored in a shared storage without any inconstancy.

Finally, turning now to FIG. 5E, FIG. 5E shows that virtual machines A-C, F, G, and H are populated and backed up, and virtual machines E and I have completed their migrations. As a result, and as described above in steps 442-446 in FIG. 4C, virtual machines E and I are removed from the excluded group (528) and placed in a new backup grouping 4 (530) in the backup groupings queue (540) to wait for their turn to be backed up.

End of Example

Figure 6:
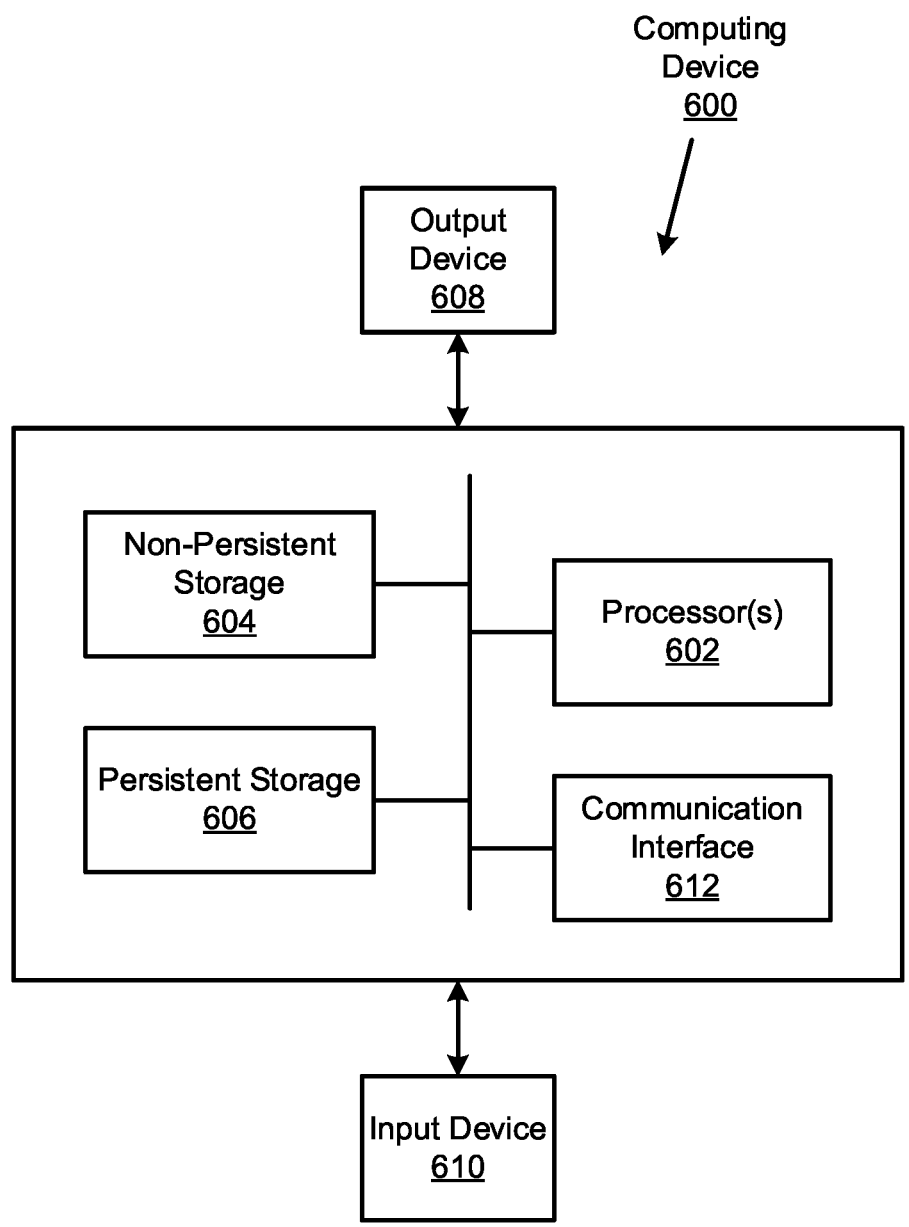
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may provide an improved method for generating backups of resources in a distributed environment. Specifically, embodiments of the invention may provide a method for generating backups that: (i) is more efficient compared to contemporary methods, in which a disable migration command is not being issued to the production hosts that are involved in migration of one or more virtual machines; (ii) reduces the chance of data loss and data inconsistency; (iii) increases the accuracy of estimated time to complete the backup process; and (iv) maintains nested application consistency. For example, disabling migration during the backup process prevents the failure of shadow copy generation, and thus improves efficiency of the backup process and reduces data inconsistency.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A, and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing a data backup process on a cluster, the method comprising:
    obtaining a backup generation request for virtual machines;
    in response to obtaining the backup generation request:
        generating a first set of backup groupings based on the backup generation request, wherein each of the first set of backup groupings comprises at least one of the virtual machines;
        issuing a disable migration command to a plurality of production hosts, wherein each of the plurality of production hosts is associated with at least one of the virtual machines;
        identifying, after the issuing, a virtual machine, in a production host of the plurality of production hosts, of the virtual machines that is migrating;
        removing, based on the identifying, the virtual machine from the first set of backup groupings to obtain a second set of backup groupings, wherein the virtual machine is placed in an excluded group after the removing; and
        backing up the second set of backup groupings.

2. The method of claim 1, further comprising:
    after backing up the second set of backup groupings, determining the virtual machine that has not completed migration; and
    in response to the determination, maintaining the virtual machine in the excluded group, wherein no members of the excluded group are backed up.

3. The method of claim 1, further comprising:
    after backing up the second set of backup groupings, determining that the virtual machine has completed migration; and
    in response to the determination, initiating a backup of the virtual machine.

4. The method of claim 1, wherein issuing the disable migration command to the plurality of production hosts comprises:
    identifying the plurality of production hosts,
    wherein the disable migration command is issued to the identified plurality of production hosts.

5. The method of claim 4, wherein identifying the plurality of production hosts comprises using a production host to virtual machine mapping or application to virtual machine mapping.

6. The method of claim 1, wherein the disable migration command prevents the plurality of production hosts from initiating new migrations.

7. The method of claim 1, wherein identifying the virtual machine that is migrating comprises:
    attempting to obtain a shadow copy of the virtual machine;

determining that the attempt to obtain the shadow copy of the virtual machine has failed; and determining, based on the failure, that the virtual machine is migrating.

8. A production host for hosting virtual machines, comprising:
- a processor;
- a persistent storage storing:
  - a first set of backup groupings, and
  - a backup process stack; and
- a production agent programmed to:
  - obtain backup generation requests for the virtual machines; and
  - in response to obtaining the backup generation requests: generate the first set of backup groupings based on the backup generation requests, wherein each of the first set of backup groupings comprises at least one of the virtual machines;
  - issue a disable migration command to a plurality of production hosts, wherein each of the plurality of production hosts is associated with at least one of the virtual machines;
  - identify, after the issuing, a virtual machine, in a production host of the plurality of production hosts, of the virtual machines that is migrating;
  - remove, based on the identifying, the virtual machine from the first set of backup groupings to obtain a second set of backup groupings, wherein the virtual machine is placed in an excluded group after the removing; and
  - backup the second set of backup groupings.

9. The production host of claim 8, wherein the production agent is further programmed to:
- after backing up the second set of backup groupings, determining the virtual machine that has not completed migration; and
- in response to the determination, maintaining the virtual machine in the excluded group, wherein no members of the excluded group are backed up.

10. The production host of claim 8, wherein the production agent is further programmed to:
- after backing up the second set of backup groupings, determining that the virtual machine has completed migration; and
- in response to the determination, initiate a backup of the virtual machine.

11. The production host of claim 8, wherein issuing the disable migration command to the plurality of production hosts comprises:
- identifying the plurality of production hosts,
- wherein the disable command is issued to the identified plurality of production hosts.

12. The production host of claim 11, wherein identifying the plurality of production hosts comprises using a production host to virtual machine mapping or application to virtual machine mapping.

13. The production host of claim 8, wherein the disable migration command prevents the plurality of production hosts from initiating new migrations.

14. The production host of claim 8, wherein identifying the virtual machine that is migrating comprises:
- attempting to obtain a shadow copy of the virtual machine;
- determining that the attempt to obtain the shadow copy of the virtual machine has failed; and
- determining, based on the failure, that the virtual machine is migrating.

15. A non-transitory computer readable medium comprising computer readable program code, which when executed by a computer processor enables the computer processor to perform a method for hosting virtual machines, the method comprising:
- obtaining backup generation requests for the virtual machines; and
- in response to obtaining the backup generation requests:
  - generating a first set of backup groupings based on the backup generation request, wherein each of the first set of backup groupings comprises at least one of the virtual machines;
  - issuing a disable migration command to a plurality of production hosts, wherein each of the plurality of production hosts is associated with at least one of the virtual machines;
  - identifying, after the issuing, a virtual machine, in a production host of the plurality of production hosts, of the virtual machines that is migrating;
  - removing, based on the identifying, the virtual machine from the first set of backup groupings to obtain a second set of backup groupings, wherein the virtual machine is placed in an excluded group after the removing;
  - backing up the second set of backup groupings
  - after backing up the second set of backup groupings, determining the virtual machine that has not completed migration; and
  - in response to the determination, maintaining the virtual machine in the excluded group, wherein no members of the excluded group are backed up.

16. The non-transitory computer readable medium of claim 15, wherein after backing up the second set of backup groupings, determining that the virtual machine has completed migration; and
- in response to the determination, initiate a backup of the virtual machine.

17. The non-transitory computer readable medium of claim 15, wherein issuing the disable migration command to the plurality of production hosts comprises:
- identifying the plurality of production hosts,
- wherein the disable command is issued to the identified plurality of production hosts.

18. The non-transitory computer readable medium of claim 15, wherein identifying the plurality of production hosts comprises using a production host to virtual machine mapping or application to virtual machine mapping.

19. The non-transitory computer readable medium of claim 15, wherein the disable migration command prevents the plurality of production hosts from initiating new migrations.

20. The non-transitory computer readable medium of claim 15, wherein identifying the virtual machine that is migrating comprises:
- attempting to obtain a shadow copy of the virtual machine;
- determining that the attempt to obtain the shadow copy of the virtual machine has failed; and
- determining, based on the failure, that the virtual machine is migrating.

* * * * *